US012563653B2

(12) United States Patent
Avery, Jr.

(10) Patent No.: US 12,563,653 B2
(45) Date of Patent: Feb. 24, 2026

(54) CURRENT-LIMITING CIRCUIT FOR LED POWER SUPPLY

(71) Applicant: Elemental LED, Inc., Reno, NV (US)

(72) Inventor: William H. Avery, Jr., Reno, NV (US)

(73) Assignee: Elemental LED, Inc., Reno, NV (US)

(*) Notice: Subject to any disclaimer, the term of this patent is extended or adjusted under 35 U.S.C. 154(b) by 174 days.

(21) Appl. No.: 18/489,376

(22) Filed: Oct. 18, 2023

(65) Prior Publication Data

US 2024/0188203 A1 Jun. 6, 2024

Related U.S. Application Data

(60) Provisional application No. 63/380,108, filed on Oct. 19, 2022.

(51) Int. Cl.
*H05B 45/46* (2020.01)

(52) U.S. Cl.
CPC .................................... *H05B 45/46* (2020.01)

(58) Field of Classification Search
CPC ...................................................... H05B 45/46
USPC .......................................................... 315/307
See application file for complete search history.

(56) References Cited

U.S. PATENT DOCUMENTS 8,680,781 B1 * 3/2014 Pflaum ................. H05B 45/375 315/307
8,830,702 B2 * 9/2014 Macfarlane ........... H02M 1/083 363/19
10,560,017 B2 * 2/2020 Muramatsu ............... G05F 1/10
10,874,009 B2 * 12/2020 Ichikawa ................ F21S 41/16
11,445,588 B1 * 9/2022 Lu ......................... H05B 45/37
11,647,574 B2 5/2023 Avery, Jr.
2009/0174338 A1 * 7/2009 Muramatsu ............ H05B 45/10 315/250
2012/0169240 A1 * 7/2012 Macfarlane ............ H05B 45/38 323/210
2014/0111093 A1 * 4/2014 Sun ...................... H05B 45/395 315/127
2014/0191740 A1 * 7/2014 Ferrario ................. H05B 45/38 323/282
2014/0320099 A1 * 10/2014 Chen ................... H02M 1/4225 323/282
2014/0354186 A1 * 12/2014 Sun ...................... H05B 45/385 315/310
2016/0081171 A1 * 3/2016 Ichikawa ............... H05B 47/25 315/77

(Continued)

*Primary Examiner* — Ryan Jager
(74) *Attorney, Agent, or Firm* — Patentbest; Andrew McAleavey

(57) ABSTRACT

A regulator circuit and driver including the regulator circuit use a variable-resistance element, such as a transistor, to limit the current in the circuit when the current is above a defined current threshold. The circuit may be comprised of a first amplifier circuit that senses a current in the circuit and generates a voltage signal in proportion thereto. The circuit also includes a mechanism for controlling a voltage applied to the first circuit element to limit the current flow. That may be a second amplifier circuit that takes the voltage signal from the first op amp and a reference voltage and outputs a control voltage for the variable-resistance element, or it may be a digital computing device that outputs a control voltage that causes the variable-resistance element to stop current flow for some defined period of time around current peaks.

8 Claims, 6 Drawing Sheets

(56) References Cited

U.S. PATENT DOCUMENTS

| | | | | |
|---|---|---|---|---|
| 2016/0088693 | A1* | 3/2016 | Zhao | H05B 45/375<br>315/51 |
| 2016/0366730 | A1* | 12/2016 | Tse | H05B 45/30 |
| 2018/0339642 | A1* | 11/2018 | Kikuchi | B60Q 1/04 |
| 2019/0016249 | A1* | 1/2019 | Ichikawa | H05B 45/48 |
| 2019/0110345 | A1* | 4/2019 | Ichikawa | B60Q 1/04 |

* cited by examiner

CURRENT-LIMITING CIRCUIT FOR LED POWER SUPPLY

CROSS-REFERENCE TO RELATED APPLICATIONS

This application claims priority to, and the benefit of, U.S. Provisional Patent Application No. 63/380,108, filed Oct. 19, 2022, the contents of which are incorporated by reference herein in their entirety.

TECHNICAL FIELD

The invention relates to power regulation circuits, and in particular, power regulation circuits for LED power supplies.

BACKGROUND

Lighting fixtures based on light-emitting diodes (LEDs) have supplanted most legacy incandescent and fluorescent light sources. LED-based lighting fixtures or luminaires are now commonly used for general area lighting, task lighting, and in specialty applications, such as outdoor lighting. Generally speaking, LED-based luminaires are more energy efficient than legacy sources, and in many cases, they can be constructed to have longer lifetimes than, for example, a typical incandescent bulb.

One difficulty in working with LEDs is the type of power that they typically use. Most household and commercial power is high-voltage, alternating current (AC) power, typically 110-277V at 50 or 60 cycles per second (Hz), depending on local conventions. Most LED lighting takes low voltage, direct current (DC) power. Thus, in order to power an LED luminaire, some additional component or circuit is provided to convert high-voltage AC power to low-voltage DC power. In the industry, this component is called a driver.

In industry terms, drivers fall broadly into one of two categories: magnetic and electronic. A magnetic driver uses a traditional power line transformer-rectifier topology and may have additional circuits at the output of the rectifier to smooth or filter the resulting power. (Magnetic drivers take their name from the fact that transformers use the interplay of electric currents and magnetic fields to step down the incoming AC voltage.) Electronic drivers use a variety of circuit topologies to step down the voltage and rectify it; their unifying characteristic is that they do not use a traditional transformer.

Because of the wire windings and laminated steel core in a transformer, magnetic drivers are usually heavy, but their construction and circuit topology are usually simpler, they are often available at a lower cost than electronic drivers, and they are viewed as highly reliable. Electronic drivers are often smaller and lighter, but they often have a shorter lifetime than magnetic drivers. Thus, despite their weight and size, magnetic drivers are still frequently used in applications where reliability is important and driver replacement after installation may be difficult.

The output of most magnetic and electronic drivers is considered to be a form of DC power, but that does not mean that the output voltage is necessarily constant. In many cases, both magnetic and electronic drivers produce an output voltage that has some time-varying component. This can cause problems in some situations.

BRIEF SUMMARY

One aspect of the invention relates to a regulator circuit. The regulator circuit comprises a first circuit element having a variable, controllable resistance and a resistance control terminal. The first circuit element is adapted to be disposed in either a voltage-out line or a minus-return line of a power supply. A first amplifier circuit is coupled to the voltage-out line or the minus-return line of the power supply to detect a current flow therein and to generate an amplified voltage signal in proportion thereto. The regulator circuit includes means for controlling a voltage applied to the resistance control terminal of the first circuit element to limit the current flow in the circuit.

The first amplifier circuit may, for example, comprise a first operational amplifier (op amp) configured as a non-inverting amplifier with inverting and non-inverting inputs connected across a current-detecting resistor disposed in the voltage-out line or the minus-return line. The first circuit element may be, e.g., a transistor.

The means for controlling the voltage applied to the resistance control terminal may comprise either analog or digital circuit elements. For example, in one embodiment, the means may comprise a second amplifier circuit that receives the amplified voltage signal from the first amplifier circuit and a reference voltage from a reference voltage source and has an output connected to the resistance control terminal of the first circuit element.

With this arrangement, the level of power in the first circuit element may be high. In order to reduce the power in the first circuit element, the regulator circuit may also comprise a third amplifier circuit. The third amplifier circuit may comprise a third op amp receiving a remainder voltage at a first input thereof and a second reference voltage at a second input thereof and generating at an output thereof an adjustment voltage. In this case, the output of the third op amp is connected to the reference voltage source such that the adjustment voltage alters the reference voltage when the remainder voltage is higher than a predefined remainder voltage threshold. The effect of this reduces the power in the first circuit element.

The means for controlling the voltage applied to the voltage regulation terminal may also comprise a digital computing device, such as a microcontroller or microprocessor. The digital computing device receives the amplified voltage signal, a signal indicating a voltage in the voltage out line, and a timing signal. An output of the digital computing device is connected to the resistance control terminal of the first circuit element.

The digital computing device is configured and adapted to detect a nominal current flow for a predefined nominal voltage, interrupt the current flow for a defined period at or around a current peak, and adjust the defined period until a calculated average current flow in the circuit is equal to or within a threshold of the nominal current flow.

Another aspect of the invention relates to a driver. The driver includes a power-line transformer receiving high-voltage, alternating current (AC) power, a full-bridge rectifier connected to an output of the power-line transformer, a voltage-out line connected at one end to an output of the full-bridge rectifier, a voltage-out terminal connected to the voltage out line, a return line, a minus-return terminal connected to the return line, and a regulator circuit as described above.

Yet another aspect of the invention relates to a method. The method comprises measuring a current flow to the load in a power circuit given a time-varying voltage output to the load, and generating a control voltage based on said measuring that causes a variable-resistance element to limit the current flow.

In one embodiment, generating the control voltage comprises causing the variable-resistance element to increase in resistance so as to limit the current flow to a defined current threshold.

In another embodiment, generating a control voltage may comprise measuring a nominal current in the power circuit at a nominal voltage, measuring an average current in the circuit, and, while the average current in the circuit is greater than the nominal current, generating the control voltage such that the variable-resistance element prevents the current flow for a defined period of time proximate to a peak current in the power circuit so as to limit the average current in the circuit such that it is equal to or within a threshold of the nominal current.

Other aspects, features, and advantages of the invention will be set forth in the following description.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
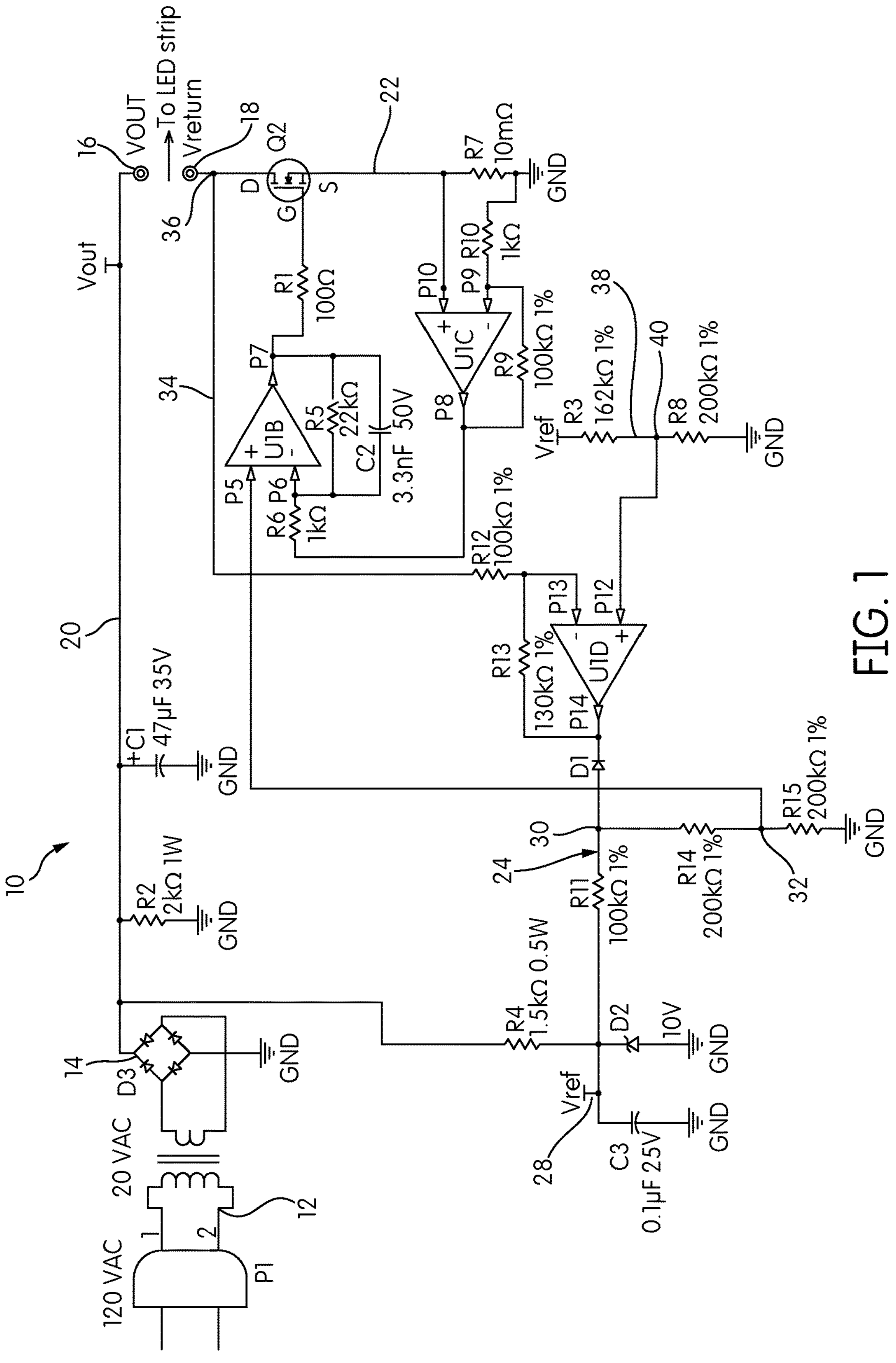
FIG. 1 is a circuit diagram of a regulator circuit for a driver according to one embodiment of the invention.

FIG. 1 is a circuit diagram of a regulator circuit, generally indicated at 10, according to one embodiment of the invention. The regulator circuit 10 is intended to be used in a so-called magnetic driver, and in the view of FIG. 1, a transformer 12 takes in high-voltage alternating-current (AC) power, steps the voltage down to low voltage, and supplies it to a rectifier 14, which converts it to direct current (DC) power. The regulator circuit 10 has a voltage out terminal 16 that provides a voltage $V_{out}$ to a load and a minus-return terminal 18 that accepts a return voltage $V_{return}$. As will be described below in more detail, the regulator circuit 10 regulates the voltage waveform of the power it supplies in order to limit the peak output current.

For purposes of this description, the term "high voltage" refers to voltages over 50V. The term "low voltage" refers to voltages under 50V. In typical household and industrial usage, the power accepted by the transformer 12 may range from 120-277 VAC, although higher and lower voltages are possible. Typically, the frequency of the incoming power is 50 Hz or 60 Hz, although other power frequencies are possible. This description assumes that the input power is of a single phase. In the illustrated embodiment, the transformer 12 steps the voltage down to 20 VAC, although higher and lower voltages are possible (e.g., 12V, 24V, 48V, etc.). The output voltage of the transformer 12 is not critical and may vary from embodiment to embodiment.

Once the rectifier 14 has done its job, the result is a rectified AC voltage waveform. As was noted above, while this kind of rectified voltage waveform is often considered to be a form of DC power, it is still time-varying, and devices such as LED light engines that are connected to the driver and regulator circuit 10 will respond to the time-varying voltage. All time-varying voltages referred to in this description are root-mean-square (RMS) voltages, meaning that the actual peak voltages in the circuit are higher. For example, a 20V rectified RMS AC voltage will peak at about 28V. A typical LED circuit might require, e.g., 20 or 24 VDC to operate. Around the peak of a 20 or 24V AC or rectified AC voltage waveform, much more voltage may be applied to the LED circuit than necessary for its operation, and much more current may flow in the circuit than its components are built to use. While this over-voltage/over-current situation may persist for only a few milliseconds at a time, the resulting current flow may overwhelm resistors or current-control integrated circuits in the LED circuit and could burn out some of the LED light engines.

The regulator circuit 10 is specifically adapted to monitor a time-varying applied voltage and to cut the voltage output around voltage peaks so as to control the applied power to prevent large surges in current. As will be clear from the description below, it does so using common, inexpensive components. In particular, the circuit 10 operates without using more expensive and complex components, like a multiplier.

The regulator circuit 10 includes a voltage out line 20 connected between the rectifier 14 and the voltage out terminal 16, as well as a return line 22 connected to the minus-return terminal 18. A series element Q2, such as a field-effect transistor (FET), is interposed in one of those lines 20, 22 to temporarily limit current flow around the peaks of a time-varying voltage waveform. As will be described below in more detail, the series element Q2 serves to provide a variable resistance to the flow of current. In FIG. 1, the series element Q2 is an n-channel FET disposed in the return line 22, although in other embodiments, the series element Q2 could be a p-channel FET disposed in the voltage output line 20. The advantage of an n-channel FET in the return line 22 is that n-channel FETs are generally less expensive than their p-channel counterparts. As shown in FIG. 1, the source S of the transistor Q2 is referenced to ground; the drain D is connected to the minus-return terminal 18.

The voltage output line 20 has a relatively simple topology: a capacitor C1 and a resistor R2 are disposed in it, both referenced to ground. The capacitor C1 has a capacitance in this embodiment of 47 μF and serves to smooth the voltage waveform to some extent. Specifically, when the voltage drops, the capacitor provides current. The capacitor C1 also provides another function: it typically lowers the peak voltage some, which helps to lessen the power that the transistor Q2 must dissipate. The resistor R1, 2200Ω, in the illustrated embodiment, performs a particularly useful function when the regulator circuit 10 is connected to an LED load: it allows the energy from the capacitor C1 to discharge and dissipate when the regulator circuit 10 is turned off. LEDs are sensitive devices, and without the resistor R1 to dissipate energy, when the circuit 10 is turned off, the capacitor C1 will discharge its energy into the LEDs, which may cause a visible glow from the LEDs for at least a few seconds after the regulator circuit 10 is turned off.

The remainder of the components in the regulator circuit 10 function to control the voltage applied to the gate G of the transistor Q2, which determines the resistance provided by the transistor Q2, and thus, when the transistor Q2 limits current flow. More particularly, two operational amplifiers (op amps) U1B, U1C are the primary components used to determine the voltage applied to the gate G. As will be described below in more detail, these two op amps U1B, U1C are connected and configured such that current flow is limited for short periods around peak applied voltages.

Op amp U1C has both of its inputs P9, P10 connected to a current-sensing resistor R7 in the return line 22 to ground. Resistor R7 has a small resistance in this embodiment, 0.01Ω, so that only a very small amount of the output voltage is lost. The non-inverting input P10 connects directly to resistor R7. The inverting input P9 connects to resistor R7 through resistor R10, which has a 1 kΩ resistance in the illustrated embodiment. The inverting input P9 of op amp U1C is connected to its output pin P8 through resistor R9, which has a 100 kΩ resistance in the illustrated embodiment. Overall, op amp U1C serves as a non-inverting amplifier that amplifies the voltage dropped across the current sensing resistor R7 as an indication of the current flowing in the return line 22. Resistor R9 and resistor R10 give op amp U1C an amplification factor of 101 in the illustrated embodiment.

Op amp U1B is configured as a differential amplifier. The inverting input P6 of op amp U1B receives the amplified voltage from the output pin P8 of op amp U1C through resistor R6, which is connected in series between the output pin P8 of op amp U1C and the inverting input P6 of op amp U1B. The voltage at the output pin P7 of op amp U1B is fed back to its inverting input P6 through resistor R5. A small capacitor C2 is provided in parallel with resistor R5 for stability and smoothing. In the illustrated embodiment, resistor R5 has a resistance of 22 kΩ, resistor R6 has a resistance of 1 kΩ, and capacitor C2 has a capacitance of 3.3 nF. The non-inverting input pin P5 of op amp U1B receives a reference voltage.

To generate the reference voltage, a reference voltage line 24 is connected in parallel with the voltage out line 20 through resistor R4, which, in this embodiment, has a 1.5 kΩ resistance. Connected to the reference voltage line 24 is a Zener diode D2, arranged in the circuit 10 so as to be reverse-biased by the voltage from the voltage out line 20, as is typical for Zener diodes. The Zener diode D2 acts as a voltage regulator, pinning the maximum voltage along the reference line to its Zener voltage. For example, if the Zener voltage of the Zener diode D2 is 10V, the voltage $V_{ref}$ at point 28 is also 10V. The Zener diode D2 may be, for example, a BZX84-C10 215 Zener diode (Nexperia, Nijmegen, the Netherlands). (The voltage $V_{ref}$ is also used to supply power to the op amps U1B, U1C.)

Resistors R11, R14, and R15 form a voltage divider to provide two reference voltages. In the illustrated embodiment, resistor R11 has a resistance of 100 kΩ. Given this, if $V_{ref}$ at point 28 (i.e., the Zener voltage of Zener diode D2) is 10V, the voltage at the junction 30 between resistor R11 and resistor R14 might be about 8V, and the resistances of R14 and R15 might be chosen such that the voltage at the junction 32 between them is 4V. Resistors R14 and R15 have equal resistances, in this case 200 kΩ, which means that the voltage at the junction 32 between resistors R14 and R15 is half of the voltage at junction 30. Junction 32 is connected to the non-inverting input P5 of op amp U1B.

Op amp U1B is configured and arranged in the circuit 10 to limit the maximum current to the LED light engines by lowering the gate voltage of transistor Q2 if the current rises above the amount determined by the reference voltage on non-inverting input P5. The output pin P7 of the op amp U1B is connected to the gate G of the transistor Q2 through resistor R1, which, in this embodiment, has a relatively small resistance of 100Ω.

In operation, an LED circuit connected to the voltage out and minus-return terminals 16, 18 of the regulator circuit 10 will consume some or most of the voltage supplied by the regulator circuit 10. The remaining voltage will appear in the return line between the minus-return terminal 18 and ground, where its magnitude will be compared with a reference voltage 40 and amplified by op amp U1D. That voltage signal can lower the reference voltage fed into op amp U1B, which controls the gate G of transistor Q2. The gains of the op amps U1B, U1C and the value of the reference voltage applied to non-inverting input P5 of op amp U1B are chosen so as to generate a voltage at the gate G appropriate to limit the flow of current at and near any voltage peaks. The various resistances, Zener voltages, capacitances, etc. are chosen in view of what the peak voltages are or are likely to be.

As configured and shown in FIG. 1, op amps U1B and U1C are sufficient to perform the function of controlling the transistor Q2 to limit the voltage at the peak of a time-varying voltage waveform so that the current to which LEDs are exposed does not skyrocket. However, there is another consideration: the power in the transistor Q2 itself.

Any time the load on circuit 10 creates only a small voltage drop compared with the output voltage of the circuit 10, there is the possibility that there may be high power in transistor Q2. For example, as will be described below in more detail, strips of linear lighting are usually divided into repeating blocks or segments, each segment containing a number of LEDs, and each segment connected in parallel between voltage and minus-return terminals. If there are a small number of LEDs in each segment of the linear lighting, then the voltage drop will be small and the remaining voltage in the circuit 10 will be high. When the transistor Q2 limits the current around voltage peaks in this scenario, it does so with higher voltage across its source to drain. The combination of high current through transistor Q2 and a high voltage across transistor Q2 produces high power in transistor Q2. In order to limit the temperature rise of transistor Q2, the power in transistor Q2 is most advantageously limited to less than some value. This prevents burnout of transistor Q2.

Op amps U1B and U1C limit the current, as described above. A third op amp U1D is provided to reduce the maximum power in transistor Q2 if a load creates only a small voltage drop. As the voltage across transistor Q2 increases, the drain voltage increases, and when it reaches a certain level, op amp U1D reduces the reference voltage to op amp U1B, which lowers the current limit. The circuit values are chosen so that the maximum power in transistor Q2 stays below a certain threshold.

Specifically, the inverting input P13 of op amp U1D is connected to junction 36 in FIG. 1 through resistor R12 to sense the return voltage at the minus-return terminal 18. Resistor R12 has a resistance of 100 kΩ, in this embodiment. The inverting input P13 is connected to the output pin P14 of op amp U1D through resistor R13, which has a resistance of 130 kΩ in this embodiment. The non-inverting input P12 of op amp U1D receives a reference voltage from a voltage divider 38 that takes the reference voltage $V_{ref}$ and divides it using resistors R3 and R4. The junction 40 between resistors R3 and R4 is directly connected to the non-inverting input P12. In this embodiment, resistor R3 has a resistance of 162 kΩ and resistor R4 has a resistance of 200 kΩ.

As the voltage at the drain D of transistor Q2 goes up, the voltage on the output pin P14 of op amp U1D goes down. As shown in FIG. 1, the output pin P14 of op amp U1D is connected to the cathode of a diode D1. Diode D1 is arranged to be forward biased when the voltage at output pin P14 of op amp U1D is lower than the voltage at junction 30. Diode D1 may have a small forward voltage of, e.g., 0.7V. In this arrangement, as the voltage on the output pin P14 of op amp U1D drops, it lowers the reference voltage at junction 30. This lowers the current limit, thus also lowering the maximum power in transistor Q2.

Thus, op amp U1D and its associated components serve as a voltage feedback control mechanism for the portion of the circuit 10 that generates the reference voltage supplied to op amp U1B—a sufficiently high voltage at output pin P14 will reduce the voltage at junction 30, as well as the voltage at junction 32 between resistors R14 and R15. This, in turn, reduces the voltage seen at the non-inverting input P5 of op amp U1B, and thus, the maximum power in transistor Q2.

One advantage of circuit 10 is that, as shown, it does not require a multiplier in order to calculate the power in transistor Q2. By tailoring the circuit's current limit in conjunction with the circuit's voltage limit, the maximum nominal power in the transistor Q2 is held to within a specified level. While a multiplier might be more accurate, circuit 10 can be implemented at lower cost and is sufficient to protect the transistor Q2 from damage.

Although the op amps U1B, U1C, U1D in the regulator circuit are shown separately to illustrate their connections and functions, they may be a part of a single integrated circuit, such as an LM324DR (Texas Instruments, Inc., Dallas, TX, US), which includes four op-amps in a single integrated circuit. In this circuit 10, the fourth op amp is unused.

Figure 2A:
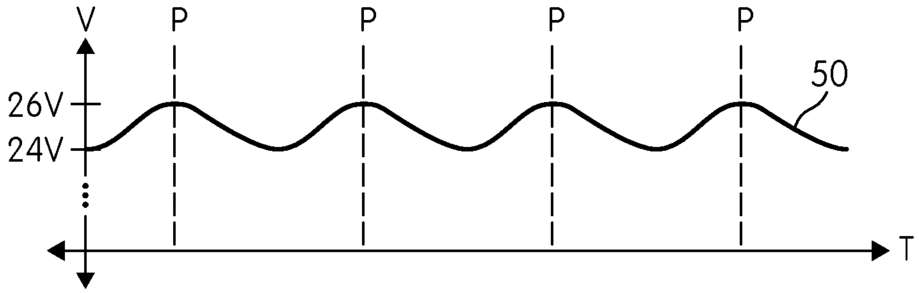
FIG. 2A is a waveform illustrating the voltage output of the circuit of FIG. 1 without any limit to the current in the circuit around voltage peaks.
Figure 2B:
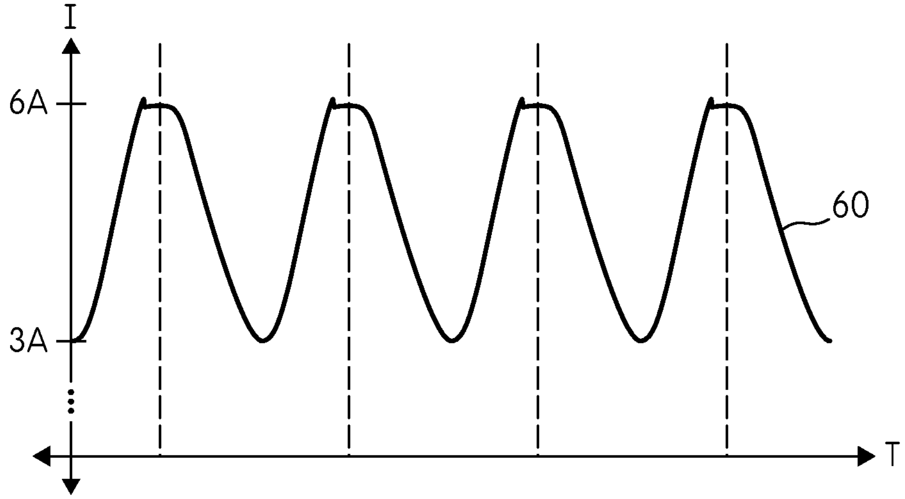
FIG. 2B is a waveform illustrating the current in the circuit of FIG. 1 with current limits imposed around voltage peaks.
Figure 2C:
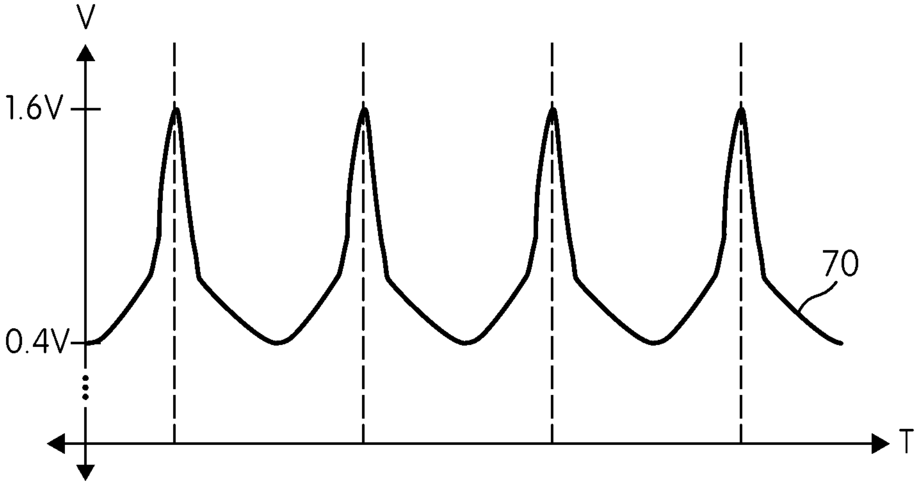
FIG. 2C is a waveform illustrating the source-to-drain voltage of the current-limiting transistor of the circuit of FIG. 1.

The overall effect of the regulator circuit 10 can be seen in FIGS. 2A, 2B, and 2C, an illustration of a set of waveforms. In FIG. 2A, the first waveform, indicated at 50, is the output of the full-wave rectifier 14. In FIG. 2B, the second waveform, indicated at 60, is the current waveform for the circuit, showing the effect of circuit 10. Peaks P are indicated by broken lines in the figures. Around the peaks P, the current is limited and, as can be seen in FIG. 2B, the current waveform 60 flattened. In this example, the current is limited to 6 amps around the peaks. FIG. 2C illustrates the source-to-drain voltage waveform 70 for the transistor Q2, which peaks at about 1.6V in this embodiment.

Figure 3:
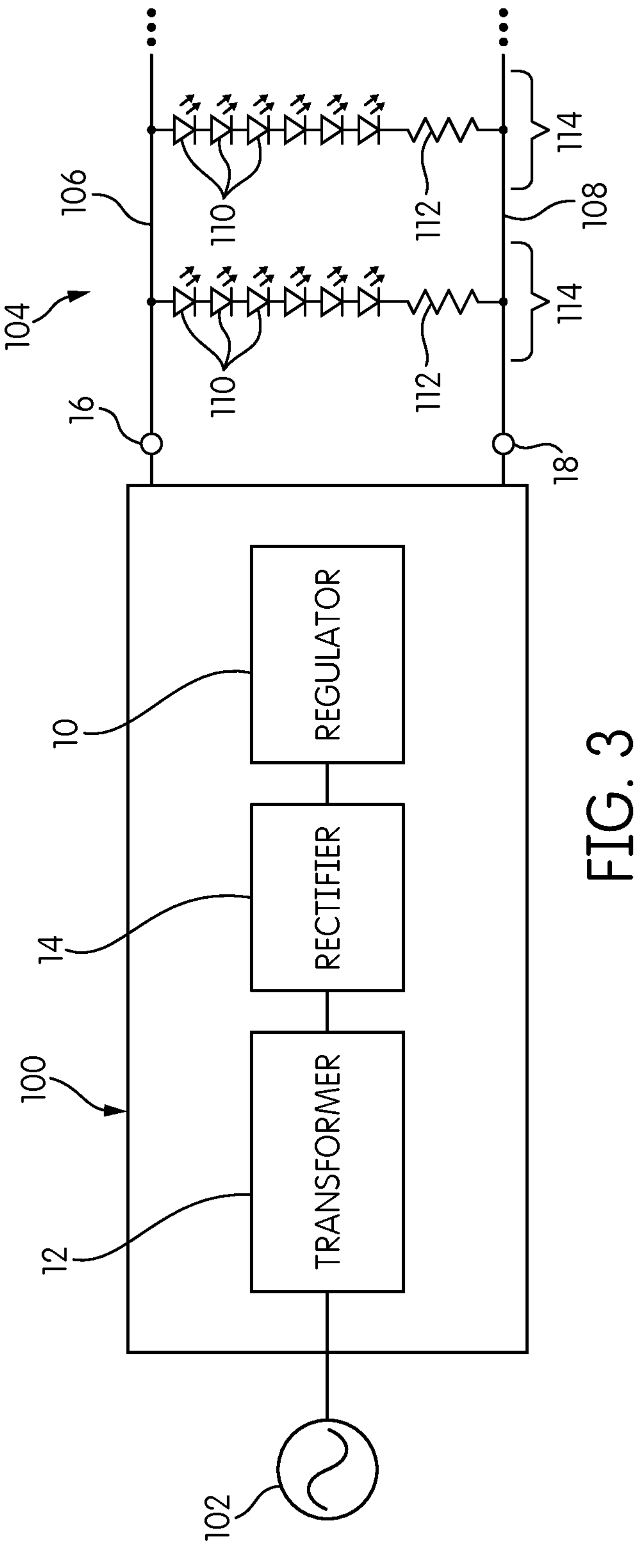
FIG. 3 is a schematic illustration of an application for the regulator circuit, illustrating a driver including the regulator circuit connected to a strip of LED linear lighting.

FIG. 3 illustrates how a circuit like the regulator circuit 10 might be used. Specifically, FIG. 3 illustrates a driver 100 that includes a transformer 12, a rectifier 14, and the regulator circuit 10 described above. Driver 100 is connected to an AC source 102 for power. In the illustration of FIG. 3, the load on driver 100 is a short strip of LED linear lighting 104.

LED linear lighting is a specific class of solid-state lighting in which an elongate, narrow printed circuit board (PCB) is populated with a number of LED light engines, spaced apart at some regular spacing or pitch. (As used here, the term "LED light engine" refers to one or more LEDs, packaged with all necessary structures and connections for mounting on the PCB.) The PCB may be either flexible or rigid. Rigid PCB may be made of, e.g., FR4, metal, ceramic, etc. Flexible PCB may be made, e.g., from a polyester film, like biaxially-oriented polyethylene terephthalate (BoPET; MYLAR®) or a polyimide. Linear lighting made with strips of flexible PCB is particularly popular because these strips can be connected at overlapping solder joints to make flexible linear lighting of arbitrary length.

Typical linear lighting PCB is constructed in two layers: a lower layer including electrical conductors, and an upper layer on which components are mounted. Components are usually surface-mounted on the PCB, but through-hole mounting and other types of mounting are sometimes seen, particularly with rigid PCB. The conductors on the lower layer are typically exposed at regular intervals to define electrical contact pads for making electrical connections to a power supply such as the driver 100. These electrical contact pads may be used as solder pads to connect power and minus-return wires by soldering, or they may be used with non-soldered electrical connectors.

FIG. 3 provides an example of a typical circuit diagram of a strip of LED linear lighting 104. a voltage conductor 106 and a minus-return or ground conductor 108 are connected to the terminals 16, 18 of the driver 100. As noted above, wires would be soldered or otherwise electrically connected to electrical contact pads on the linear lighting 104 to make these connections. Connected in parallel between the two conductors 106, 108 are a number of series of LED light engines 110 arranged so as to be forward-biased by the applied voltage. In the embodiment of FIG. 3, each series of LED light engines 110 also includes a resistor 112 to set the current in the circuit, although some versions of LED linear lighting may use a current-control integrated circuit instead of a simple resistor.

As may be apparent from FIG. 3, the strings of LED light engines 110 and resistors 112 form repeating blocks 114. Each repeating block 114 is a complete lighting circuit that will light if connected to power. Because the repeating blocks 114 are connected in parallel with respect to the voltage and minus-return conductors 106, 108, each repeating block 114 ideally sees the same input voltage. In fact, the LED linear lighting 104 may have cut points marked on its upper surface, e.g., by screen printing—each cut point allows the strip of linear lighting 104 to be cut to a desired length in the field by cutting at the boundary between repeating blocks 114.

Because of the fundamental voltage-current characteristics of LEDs, once the forward voltage of an LED is exceeded, its resistance drops precipitously. This means that, by Ohm's Law, more current can flow in the circuit. Thus, without some external element or elements to regulate the current in the LED circuit, once the applied voltage is greater than the forward voltage of the LEDs, the LEDs may be exposed to so much current that they burn out.

In industry parlance, LED lighting is usually divided into two types, depending on where the current-setting or current-regulating elements are located. The LED linear lighting 104 illustrated in FIG. 3 is referred to as constant voltage linear lighting: it includes its own on-board components, resistors 112, to set the current in the circuit and expects to receive a constant voltage. In the other type of LED lighting, constant-current LED lighting, the lighting itself usually does not include any components to set or regulate the current; instead, current-limiting components are found in the driver, which supplies a constant current.

One of the challenges of field-cuttable, constant-voltage lighting like the LED linear lighting 104 shown in FIG. 3 is that the finished length of the linear lighting 104 may not be known in advance. This, in turn, means that the total current draw and total power requirements of that strip of linear lighting 104 may not be known in advance, which is why a driver like driver 100 that can supply a variable amount of current at a constant voltage is helpful.

Although the linear lighting 104 of FIG. 3 has resistors 112 to set the current in the circuit, the resistors 112 are intended to set the current in the circuit in steady state; as passive devices, they may not be able to handle the kinds of time-varying voltage peaks and resultant current surges described above. This is why a regulator circuit like the regulator circuit 10 described above is helpful: if the voltage output from a driver is time-varying, the regulator circuit 10 imposes "guard rails" or momentary limits on the current in the circuit, providing an additional measure to ensure that the LED light engines 110 are not exposed to too much current.

While the regulator circuit 10 and drivers 100 including it may be used for a wide variety of different loads, and those loads need not be limited to LED lighting, the regulator circuit 10 may have particular use with shorter lengths of linear lighting 104. Every typical material, even a good conductor like copper, offers some resistance to the flow of current. This quality, resistivity, is usually specified in units of resistance per unit length. This means that in linear lighting 104, the conductors 106, 108 have a non-zero resistance, and that resistance increases as the length of the conductors 106, 108 increases. In many contexts, this is seen as a negative: as the length of linear lighting 104 increases, the total resistance provided by its conductors 10 increases, and thus, the voltage gradually drops as one traverses from one end of the linear lighting 104 to the other. This phenomenon, called Ohmic voltage drop, imposes a limit on the length of linear lighting 104, because there will be some length of linear lighting 104 at which the voltage remaining in the conductors 104, 106 is not sufficient to light a repeating block.

However, the inherent resistance of the conductors 106, 108 also has benefits in current handling. Because of the larger inherent resistance of its conductors 106, 108, a longer strip of linear lighting 104 may be better able to handle current surges than a shorter strip, especially as one traverses along the strip, away from the point at which power is applied. Thus, a driver 100 with a regulator circuit 10, and the current limits it imposes, may be particularly helpful in a shorter strip of linear lighting 104 with less inherent resistance.

In some ways, a driver 100 containing a regulator circuit 10 could be considered a hybrid: a constant voltage driver that has at least some current-limiting ability.

As those of skill in the art will understand, a transformer 12, a rectifier 14, and the regulator circuit 10 are not the only possible components or circuits that may be included in a driver 100. A driver according to embodiments of the invention may include other elements and circuits as well, including safety elements, like circuit breakers and temperature monitoring circuits, and performance elements and circuits, like power factor correction circuits. A regulator circuit 10 may also be used in other devices and contexts.

Figure 4:
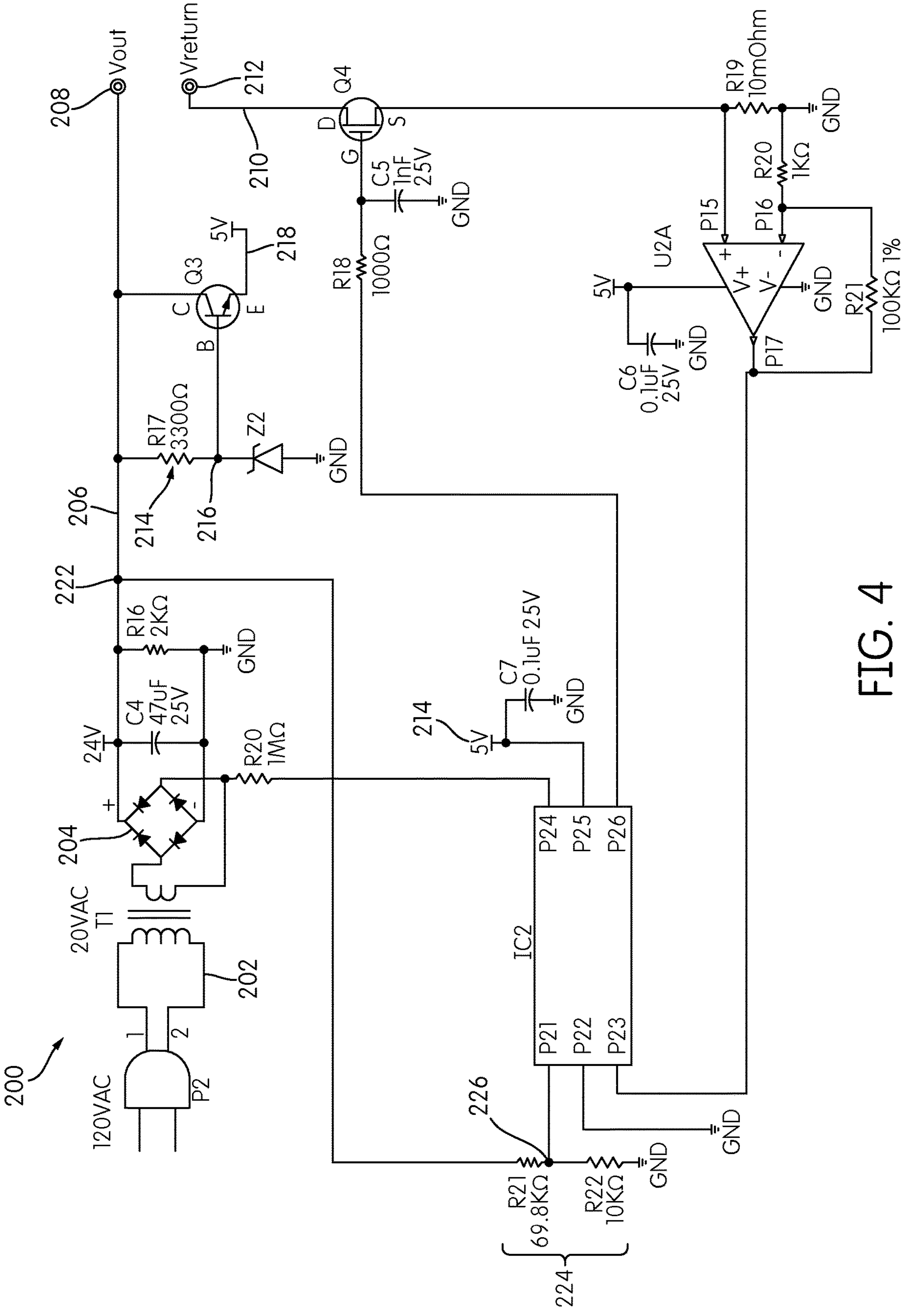
FIG. 4 is a circuit diagram of a regulator circuit according to another embodiment of the invention.

In the above description, the regulator circuit 10 is comprised of analog circuit elements. Other implementations are possible. For example, FIG. 4 is a diagram of a regulator circuit, generally indicated at 200, according to another embodiment of the invention. Like the regulator circuit 10 described above, the regulator circuit 200 receives power from a transformer 202 and a full-bridge rectifier 204, although other configurations are possible.

The regulator circuit 200 includes a voltage out line 206 connected between the rectifier 204 and the voltage out terminal 208, as well as a return line 210 connected to the minus-return terminal 212. A series element Q4, such as a field-effect transistor (FET), is interposed in one of those lines 206, 210. As with the previous embodiment, in FIG. 4, the series element Q4 is an n-channel FET disposed in the return line 210, although in other embodiments, the series element Q4 could be a p-channel FET disposed in the voltage output line 206.

In contrast to the regulator circuit 10 described above, in the regulator circuit 200, the series element Q4 is not used to produce a varying resistance that limits the current around voltage peaks. Rather, as will be explained below in more detail, the series element Q4 is controlled such that it switches off for some small period of time around the peak voltages so that the connected load is not exposed to the voltage peaks.

The voltage output line 206 has a capacitor C4 and a resistor R16 are disposed in it, both referenced to ground. The capacitor C4 has a capacitance in this embodiment of 47 μF and serves to smooth the voltage waveform to some extent. Specifically, when the voltage drops, the capacitor provides current. The capacitor C4 also provides another function: it typically lowers the peak voltage some, which helps to lessen the power that the transistor Q4 must dissipate. The resistor R16, 2000 kΩ, in the illustrated embodiment, assists in discharging the capacitor C4.

A reference voltage source, generally indicated at 214, is also derived from the output line 206. In general, voltages lower than the main operating voltage of the circuit 200 may be used to power specific components and to provide a reference voltage for differential amplification and other purposes. In some embodiments, the reference voltage source may be a voltage regulator IC that is configured to produce a specific voltage or voltages, e.g., 5V, 3V, 1.8V, etc.

In this embodiment, the reference voltage source 214 includes a Zener diode Z2 acts as a voltage regulator and has a Zener voltage of, e.g., 5.6V. The junction 216 between the Zener diode Z2 and a resistor R17 is connected to the base B of a transistor Q3, in this case an NPN transistor with a collector C connected to the output line 206 and an emitter E connected to a 5V reference voltage source 218. The transistor Q3 keeps the voltage steady as the current varies. The result is a 5V reference voltage output.

Op amp U2A has both of its inputs P15, P16 connected to a current-sensing resistor R19 in the return line 210 to ground. Resistor R19 has a small resistance in this embodiment, 0.01Ω, so that only a very small amount of the output voltage is lost. The non-inverting input P15 connects directly to resistor R19. The inverting input P16 connects to resistor R19 through resistor R20, which has a 1 kΩ resistance in the illustrated embodiment. The inverting input P16 of op amp U2A is connected to its output pin P17 through resistor R21, which has a 100 kΩ resistance in the illustrated embodiment Like its counterpart op amp U1C in the regulator circuit 10 above, op amp U2A serves as a non-inverting amplifier that amplifies the resistance dropped across current-sensing resistor R19 to provide an indication of the current flowing in the return line 210. Resistor R21 and resistor R20 give op amp U2A an amplification factor of 101 in the illustrated embodiment.

The regulator circuit 200 uses the output of op amp U2A substantially differently than in the regulator circuit 10 above. More specifically, in the regulator circuit 200, the gate G of transistor Q4 is controlled by a digital computing device, indicated as IC2 in FIG. 4. In this embodiment, the digital computing device IC2 is an 8-bit PIC10F220T-I/OT microcontroller, although the digital computing device IC2 could be a microprocessor or any other component capable of performing the functions described here. The microcontroller IC2 has six pins, labeled as pins P21-P26 in FIG. 4. Pin P25 is a power supply pin and is connected to the 5V reference source 214, with capacitor C7 as a bypass capacitor from +5V to ground. Pin P22 is referenced to ground and serves as the main ground for the microcontroller IC2. Pin P26 is configured as a voltage output pin and is connected to the gate G of transistor Q4 through an RC filter comprising resistor R18 GM resistance) and capacitor C5 (1 nF capacitance). With this arrangement, the output voltage at output pin P26 controls the gate G of transistor Q4, while the RC filter slows the rise and fall of the current very slightly to prevent the regulator circuit 200 from generating electromagnetic interference (EMI).

Generally speaking, the microcontroller IC2 receives three inputs from the other circuit elements: the output of op amp U2A, which is a voltage proportional to the current flowing in the return line 210; a scaled voltage signal indicative of the voltage in the voltage output line 206; and a timing signal, derived from the rectifier 204 or the voltage output line 206, that the microcontroller IC2 uses to determine the timing of voltage peaks. Given this, the microcontroller IC2 has three pins configured as input pins: pins P21, P23, and P24. Pins P21 and P23 and configured to take an analog voltage as input, and each pin P21, P23 is coupled to an internal analog-to-digital (A/D) converter to convert the analog voltage to a digital signal. 8-bit A/D converters may be adequate for this task. Pin P24 in this particular microcontroller IC2 is a digital input; its use will be described below in more detail.

The amplification factor of the op amp U2A is chosen so as to produce a voltage that is appropriate for the microcontroller IC2 and is large enough to provide a reasonable resolution for detecting change. For example, a voltage in the range of 0-5V may be appropriate, depending on the voltage limits of the microcontroller IC2.

The voltage in the output line 206 at junction 222 is passed through a voltage divider 224 comprising resistors R21 and R22 to produce a scaled voltage signal that is proportional to the voltage in the output line 206 at junction 222 without overpowering the microcontroller IC2. Resistor R21 has a resistance of 69.8 kΩ, and resistor R22 has a resistance of 10 kΩ in this embodiment. As is customary with a voltage divider, the junction 226 between the two resistors R21, R22 is connected to pin P21.

The timing signal may be derived by detecting any periodic component of the output power. For example, either peaks or zero-crossings could be used as a timing signal, or an arbitrary voltage threshold could be set and points at which the voltage crossed that threshold could be used as a timing signal. In this embodiment, zero crossings are used as a timing signal.

In many embodiments, the timing signal would be an analog voltage signal that would be provided to an input pin of a microcontroller that is coupled to an internal A/D converter, like pins P21 and P23. However, the microcontroller IC2 is simple and has only two analog input pins P21, P23. Fortunately, the timing signal is essentially binary: it is either high or low, particularly if zero crossings are used as a timing signal. Thus, in this embodiment, the timing signal can be provided to a digital input, so long as the current does not exceed the limits for the input pin. Thus, a time-varying voltage signal is drawn from the rectifier 204 and passed through a 1 MΩ resistor R20 to limit the current reaching digital input pin P24 of the microcontroller IC2.

The microcontroller IC2 would generally be programmed to take various actions to limit the current in the circuit, as was described above with respect to the regulator circuit 10. In some cases, for example, the microcontroller IC2 may control the gate G of transistor Q4 to change the resistance of Q4 to limit the current in the circuit around voltage peaks. However, in this embodiment, the microcontroller IC2 is programmed to take a different approach: it controls the gate G of transistor Q4 to shut off the flow of current entirely for a short, defined period of time around voltage peaks. This lowers the average current seen by the linear lighting 104.

Figure 5:
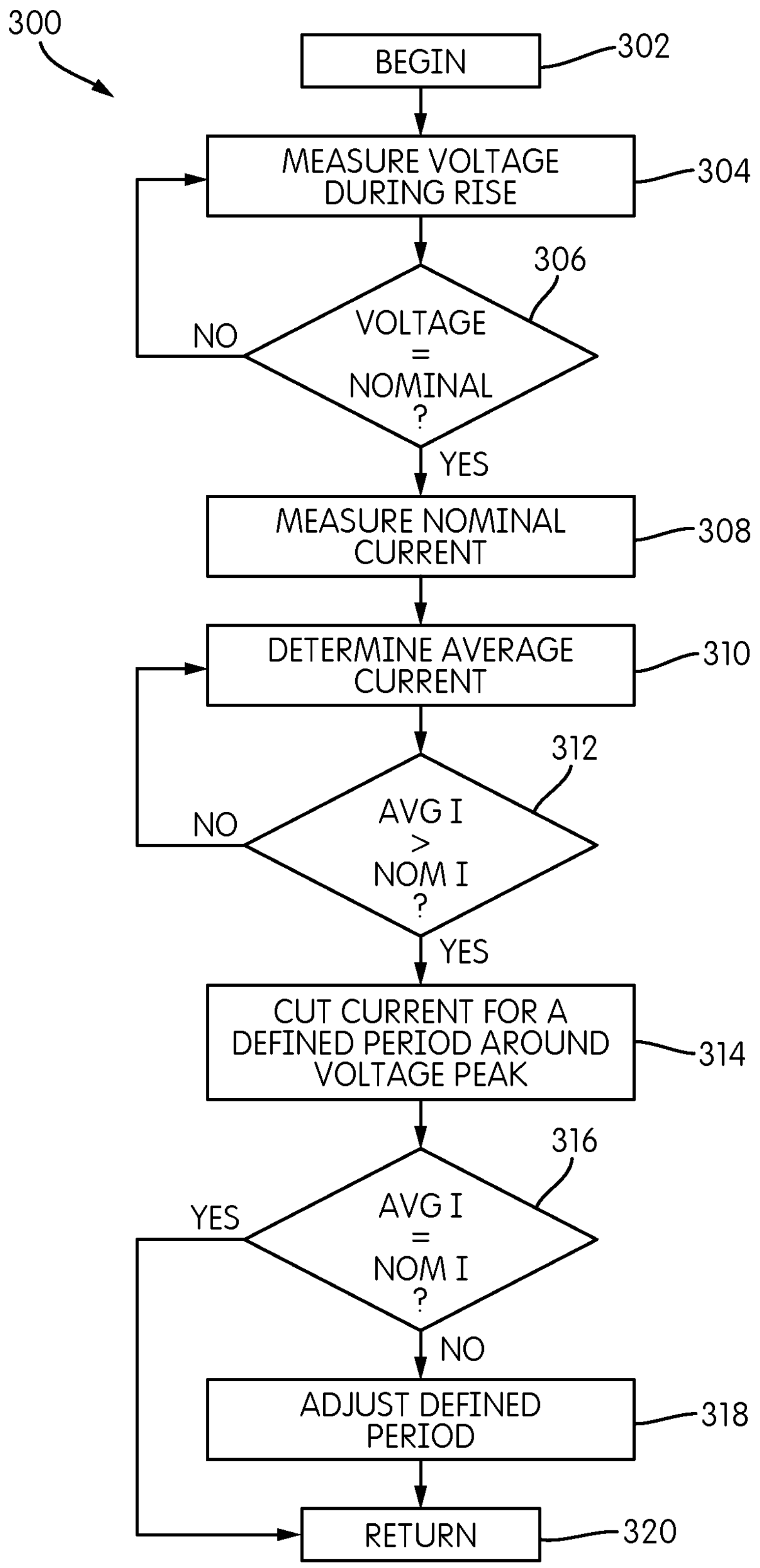
FIG. 5 is a flow diagram of a method implemented using the regulator circuit of FIG. 4.

More specifically, FIG. 5 is a schematic flow diagram of a method, generally indicated at 300, for shutting off the flow of current for a short, defined period of time around voltage peaks to limit the current in the circuit. Method 300 begins at 302 and continues with task 304. In task 304, the microcontroller IC2 measures the voltage during a period or periods in which the voltage is rising. Method 300 continues with task 306, a decision task.

Every strip of linear lighting 104 is designed for a particular nominal voltage. That voltage may be 12V, 24V, 36V, 48V, etc. In task 306, if the detected voltage (i.e., input to pin P21) indicates that the voltage in the circuit is at the nominal voltage (task 306:YES), then the microcontroller IC2 measures the current in the circuit (i.e., input to pin P23) in task 308 and sets that current as the nominal current in the circuit. Method 300 then continues with task 310. If not, control of method 300 returns to task 304 and the voltage in the circuit continues to be measured until it reaches the nominal voltage.

In task 310, the microcontroller IC2 continues to measure the current in the circuit and determines the average current in the circuit. Method 300 then continues with task 312, a decision task in which the average current in the circuit is compared with the previously-established nominal current. If the average current is greater than the nominal current (task 312:YES), then the microcontroller IC2 controls the gate G of the transistor Q4 to cut the current flow for a small, defined period, relying on the timing signal received at pin P24 to determine the appropriate timing. Method 300 continues with task 316.

In task 316, the microcontroller IC2 again compares the measured and determined average current in the circuit with the nominal current. If the two are equal, then method 300 returns at 320. If the average current is still not equal to the nominal current, then the microcontroller IC2 adjusts the defined period in task 318 before returning at 320. Typically, a method like method 300 would be operating at all times that the regulator circuit 200 is operating, which would typically be any time that the driver 100 containing the regulator circuit 200 is operating.

Figure 6A:
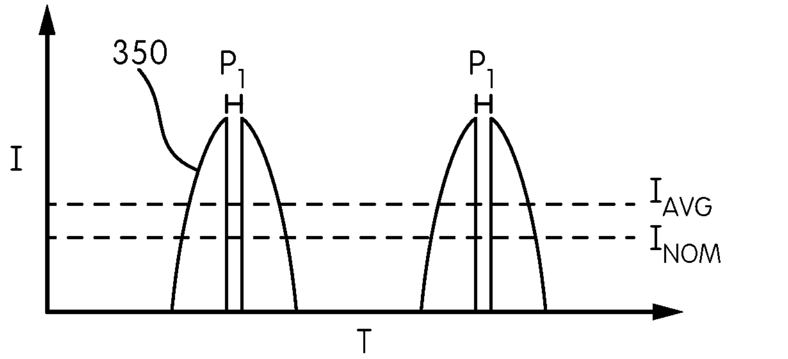
FIGS. 6A and 6B illustrate current waveforms in a power circuit using the regulator circuit of FIG. 4.
Figure 6B:
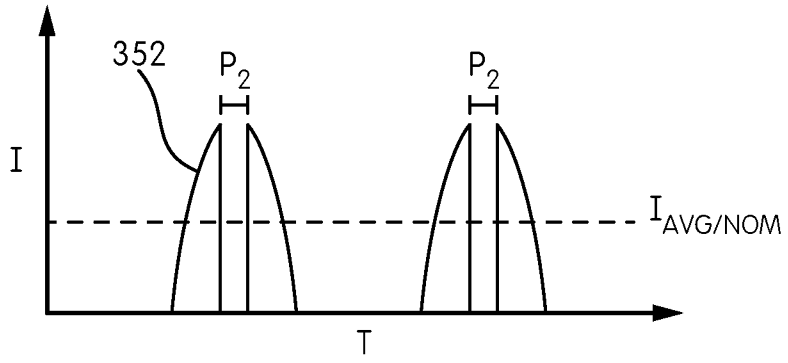

The concept of a defined period is illustrated in FIGS. 6A and 6B, both of which are plots of current (I) versus time (T). In FIG. 6A, the current waveform 350 is comprised of a series of periodic current pulses. However, as shown in FIG. 6A, at or close to the peak of each pulse, there is a period of time, $P_1$, where the current goes to zero. FIG. 6A also shows the average current in the circuit ($I_{AVG}$) which, despite the period $P_1$ of zero current, is still slightly higher than the desired nominal current ($I_{NOM}$). FIG. 6B illustrates what the microcontroller IC2 would do in task 318 of method 300 in this circumstance: the period $P_2$ in which the current goes to zero is lengthened relative to the period $P_1$ of FIG. 6A. These periods $P_1$, $P_2$ may still be quite brief. For example, the microcontroller IC2 may initially shut off current for 100 μs at or around the peaks and may lengthen that period to 200 μs if the initial period is not sufficient to bring the average current in the circuit down to desired levels. If the average current in the circuit is too low, in some embodiments, the microcontroller IC2 may reduce the period of time during which current flow is shut off.

As those of skill in the art will appreciate, although task 316 of method 300 is described as checking whether the average current in the circuit is equal to the nominal current, in some cases, a threshold could be used, so that if the average current is within some threshold range of the nominal current, no adjustment is made.

While the invention has been described with respect to certain embodiments, the description is intended to be exemplary, rather than limiting. Modifications and changes may be made within the scope of the invention, which is defined by the appended claims.

What is claimed is:

1. A regulator circuit, comprising:

a first circuit element having a variable, controllable resistance and a resistance control terminal, the first element adapted to be disposed in either a voltage-out line or a minus-return line of a power supply, the power supply producing a cyclically time-varying current;

a first amplifier circuit coupled to the voltage-out line or the minus-return line of the power supply to detect the cyclically time-varying current and to generate an amplified voltage signal in proportion thereto, the first amplifier circuit including a first op amp configured as a non-inverting amplifier with inverting and non-inverting inputs connected across a resistor disposed in the voltage-out line or the minus-return line; and means for controlling a voltage applied to the resistance control terminal of the first circuit element to limit the current flow proximate to peaks in the cyclically time-varying current, the means for controlling the voltage applied to the resistance control terminal including a second op amp configured as a differential amplifier, the second op amp receiving an output of the first op amp and a reference voltage from a reference voltage source, an output of the second op amp connected to the resistance control terminal of the first circuit element.

2. The regulator circuit of claim 1, further comprising:

a third op amp receiving a remainder voltage at a first input thereof and a second reference voltage at a second input thereof and generating at an output thereof an adjustment voltage, the output of the third op amp being connected to the reference voltage source such that the adjustment voltage alters the reference voltage when the remainder voltage is higher than a predefined remainder voltage threshold;

wherein the altered reference voltage causes a change in a voltage applied to the resistance control terminal of the first circuit element and a consequent reduction in power in the first circuit element.

3. The regulator circuit of claim 1, wherein the first circuit element comprises a transistor and the resistance control terminal comprises a gate of the transistor.

4. A driver, comprising:

a power-line transformer receiving high-voltage, alternating current (AC) power;

a full-bridge rectifier connected to an output of the power-line transformer;

a voltage-out line connected at one end to an output of the full-bridge rectifier;

a voltage-out terminal connected to the voltage out line;

a return line;

a minus-return terminal connected to the return line; and a regulator circuit according to claim 1.

5. A regulator circuit, comprising:

a transistor having a gate that defines, at least in part, a variable, controllable resistance of the transistor, the transistor adapted to be disposed in either a voltage-out line or a minus-return line of a power supply, the power supply producing a cyclically time-varying current;

a first amplifier circuit coupled to the voltage-out line or the minus-return line of the power supply to detect the cyclically time-varying current and to generate an amplified voltage signal in proportion thereto;

a reference voltage source generating a predefined reference voltage;

a second amplifier circuit having an output connected to the gate of the transistor and receiving the amplified voltage signal from the first amplifier circuit, the second amplifier circuit generating, at the output, a control voltage that causes the transistor to increase in resistance to limit the current flow when the current flow, as represented by the amplified voltage signal of the first amplifier circuit, is greater than a predefined threshold; and a third amplifier circuit receiving a remainder voltage at a first input thereof and a second predefined reference voltage at a second input thereof and generating at an output thereof an adjustment voltage, the output of the third amplifier circuit being connected to the reference voltage source such that the adjustment voltage alters the reference voltage when the remainder voltage is higher than a predefined remainder voltage threshold, such that the altered reference voltage causes a change in the control voltage and a consequent reduction in power in the transistor;

wherein the predefined threshold is predefined such that it is exceeded proximate to peaks in the cyclically time-varying current.

6. The regulator circuit of claim 5, wherein the transistor is an n-channel field-effect transistor (FET) disposed in the minus-return line.

7. The regulator circuit of claim 5, wherein the regulator circuit is without a multiplier.

8. The regulator circuit of claim 5, wherein the first amplifier circuit, the second amplifier circuit, and the third amplifier circuit comprise first, second, and third op amps, respectively.

* * * * *